US010959190B2

(12) United States Patent
Sandholm et al.

(10) Patent No.: US 10,959,190 B2
(45) Date of Patent: Mar. 23, 2021

(54) METHODS, DEVICES, AND SYSTEMS FOR DYNAMIC ALLOCATION OF COMMUNICATION RESOURCES

(71) Applicant: CABLE TELEVISION LABORATORIES, INC., Louisville, CO (US)

(72) Inventors: Thomas Sandholm, Mountain View, CA (US); Bernardo Huberman, Palo Alto, CA (US); Lin Cheng, Superior, CO (US)

(73) Assignee: CABLE TELEVISION LABORATORIES, INC., Louisville, CO (US)

( * ) Notice: Subject to any disclaimer, the term of this patent is extended or adjusted under 35 U.S.C. 154(b) by 33 days.

(21) Appl. No.: 16/460,164

(22) Filed: Jul. 2, 2019

(65) Prior Publication Data
US 2020/0008160 A1     Jan. 2, 2020

Related U.S. Application Data

(60) Provisional application No. 62/749,698, filed on Oct. 24, 2018, provisional application No. 62/693,132, filed on Jul. 2, 2018, provisional application No. 62/693,124, filed on Jul. 2, 2018.

(51) Int. Cl.
*H04W 52/34*     (2009.01)
*H04W 52/06*     (2009.01)

(52) U.S. Cl.
CPC ......... *H04W 52/346* (2013.01); *H04W 52/06* (2013.01)

(58) Field of Classification Search
CPC .......................... H04W 52/346; H04W 52/06
See application file for complete search history.

(56) References Cited

U.S. PATENT DOCUMENTS 6,393,007 B1 *   5/2002   Haartsen ............... H04J 3/1682
                                                        370/337
10,070,351 B1 *  9/2018   Oroskar ............ H04W 36/0072

* cited by examiner

*Primary Examiner* — Tuan H Nguyen
(74) *Attorney, Agent, or Firm* — PdZ Patent Law, PLLC

(57) ABSTRACT

A method for dynamic allocation of communication resources includes (1) determining a risk-return characterization of a plurality of communication resource allocations across a plurality of communication channels in a communication system, (2) selecting a first allocation of the plurality of communication resource allocations from the risk-return characterization according to at least one predetermined criterium, and (3) automatically allocating communication resources among the plurality of communication channels according to the first allocation.

19 Claims, 10 Drawing Sheets

METHODS, DEVICES, AND SYSTEMS FOR DYNAMIC ALLOCATION OF COMMUNICATION RESOURCES

RELATED APPLICATIONS

This application claims benefit of priority to (a) U.S. Provisional Patent Application Ser. No. 62/693,124, filed on Jul. 2, 2018, (b) U.S. Provisional Patent Application Ser. No. 62/693,132, filed on Jul. 2, 2018, and (c) U.S. Provisional Patent Application Ser. No. 62/749,698, filed on Oct. 24, 2018. Each of the aforementioned patent applications is incorporated herein by reference.

BACKGROUND

Communication systems can be grouped into wireline communication systems, wireless communication systems, and hybrid communication systems. Wireline communication systems rely on a tangible communication medium, such as an optical cable, a coaxial electrical cable, and/or a twisted-pair electrical cable, to transmit data. Wireless communication systems do not require a tangible communication medium, and wireless communication systems transmit data using techniques such as optical and radio frequency data transmission. Hybrid wireline-wireless communication systems include at least one wireline communication system and at least one wireless communication system.

Both wireline and wireless communication systems often include two or more communication channels. For example, a base station in a wireless communication system may transmit data via a plurality of communication channels in the form of wireless subcarriers. As another example, each wireless base station of an array of wireless base stations may transmit data via a respective communication channel. As yet another example, a digital subscriber line access multiplexer (DSLAM) may communicate with multiple clients via respective communication channels in the form of twisted-pair cables.

DETAILED DESCRIPTION OF THE EMBODIMENTS

Operation of one communication channel or path in a communication system will often affect operation of other communication channels or paths in the communication system. For example, a wireless base station configured to transmit data via a plurality wireless subcarriers typically has a total transmission power that must be allocated among the wireless subcarriers. Allocation of transmission power to one subcarrier necessarily affects the other subcarriers by limiting available transmission power to the other subcarriers. As another example, there may be interference between wireless base stations in an array of wireless base stations, such that operation of one wireless base station may affect operation of other wireless base stations in the array. As yet another example, there may be cross-talk between, for example, twisted-pair electrical cables in a common cable bundle, such that transmission of data through one twisted-pair electrical cable in the bundle may affect operation of another twisted-pair electrical cables in the bundle.

Disclosed herein are methods, devices, and systems for dynamic allocation of communication resources. The disclosed methods, devices, and systems, for example, automatically allocate communication resources among communication channels in a manner that helps maximize return (e.g., data throughput) and/or minimize risk (e.g., variation in data throughput). Certain embodiments consider stochastic properties of the communication channels to help optimize communication resource allocation in a dynamic operating environment.

Figure 1:
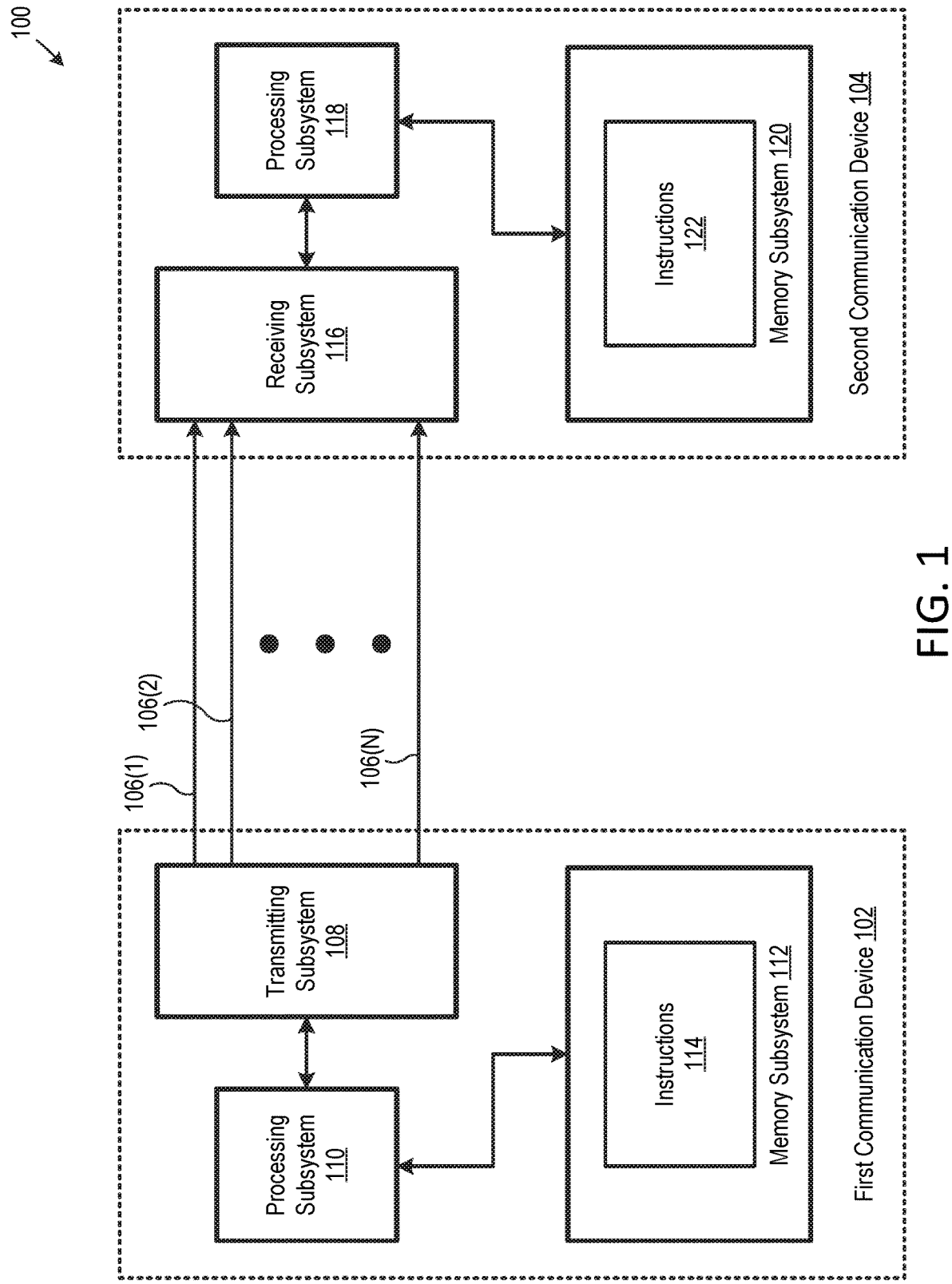
FIG. 1 is a block diagram of a communication system configured to dynamically allocate communication resources, according to an embodiment.

FIG. 1 is a block diagram of a communication system 100 configured to perform dynamic allocation of communication resources. Communication system 100 includes a first communication device 102 and a second communication device 104 communicatively coupled via N communication channels 106. Although FIG. 1 shows N being greater than two, N can be any integer greater than one. In this document, specific instances of an item may be referred to by use of a numeral in parentheses (e.g., communication channel 106 (1)) while numerals without parentheses refer to any such item (e.g., communication channels 106). Communication channels 106 are, for example, wireline communication channels, wireless communication channels, or hybrid wireline-wireless communication channels. In some embodiments, each communication channel 106 includes a respective physical communication medium, such as a respective optical cable or a respective electrical cable. In some other embodiments, at least two communication channels 106 share a common communication medium. For example, in certain embodiments, each communication channel 106 represents a respective communication signal transmitted through a common communication medium, such as air, an electrical cable, or an optical cable. As another example, in some embodiments, each communication channel 106 represents a respective subcarrier of a communication signal transmitted through a common communication medium, such as air, an electrical cable, or an optical cable.

Each communication channel 106 need not necessarily have the same configuration. For example, in one configuration, communication channel 106(1) is a wireless communication channel, and communication channel 106(2) is a wireline communication channel. Although FIG. 1 depicts communication channels 106 as being one-way communication channels, i.e. transferring data from first communication device 102 to second communication device 104, communication channels 106 could be two-way communication channels without departing from the scope hereof.

Figure 2:
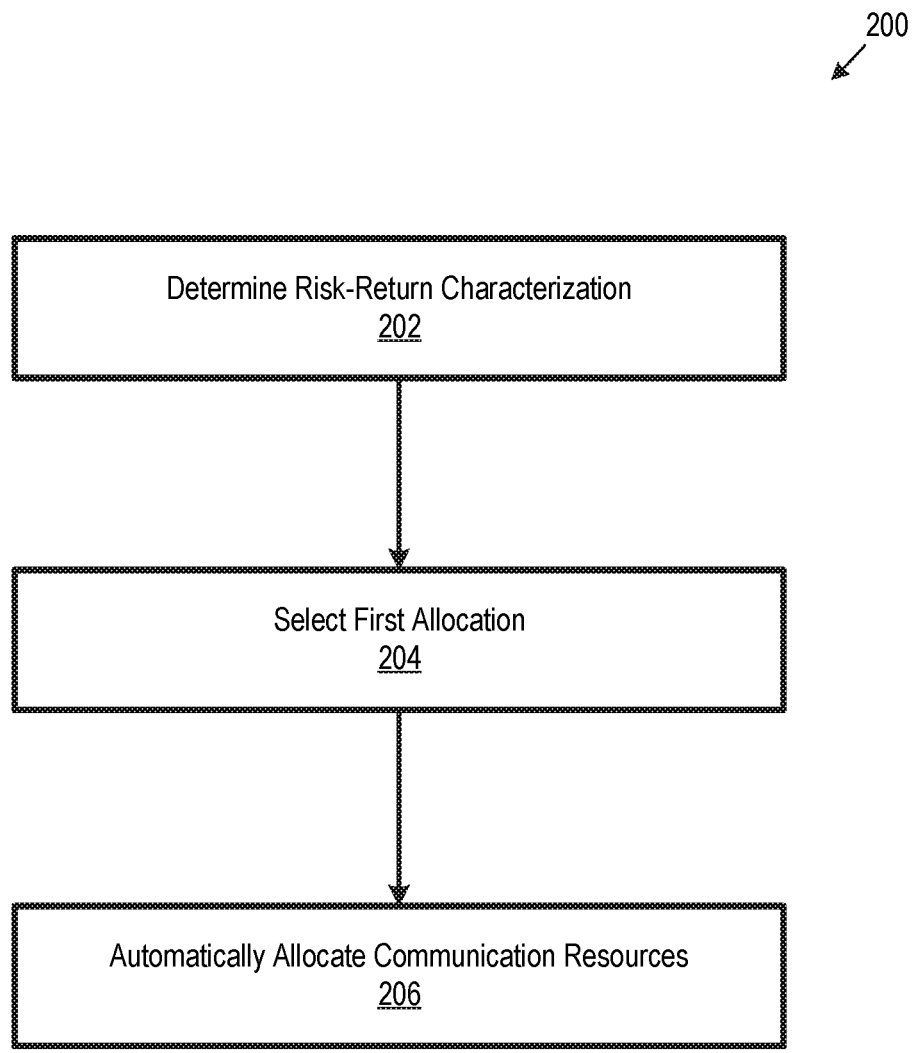
FIG. 2 is a flow chart of a method for dynamic allocation of communication resources, according to an embodiment.

First communication device 102 includes a transmitting subsystem 108, a processing subsystem 110, and a memory subsystem 112. Transmitting subsystem 108 is configured to generate a plurality of signals, e.g. radio-frequency signals for wireless transmission, electrical signals for transmission via one or more electrical cables, and/or optical signals for transmission via one or more optical cables, for transmission to second communication device 104 via respective communication channels 106. Processing subsystem 110 is configured to execute instructions 114 stored in memory subsystem 112 to control at least some aspects of first communication device 102. For example, in some embodiments, processing subsystem 110 is configured to execute instructions 114 to execute a method 200 for dynamic allocation of communication resources, which is discussed below with respect to FIG. 2. Instructions 114 include, for example, software and/or firmware.

Although each of transmitting subsystem 108, processing subsystem 110, and memory subsystem 112 is symbolically shown as a single element, one or more of these elements may include a plurality of constituent sub-elements. For example, transmitting subsystem 108 could include a plurality of transmitters, processing subsystem 110 could include a plurality of processors, and memory subsystem 112 could include a plurality of memory modules. Additionally, the elements and sub-elements of first communication device 102 could be distributed in multiple locations. For example, processing subsystem 110 could include multiple processors distributed among two or more data centers, and memory subsystem 112 could include multiple memory devices distributed among a plurality of data centers. Furthermore, transmitting subsystem 108 could be capable of receiving signals, as well as generating signals, without departing from the scope hereof.

First communication device 102 may include additional elements without departing from the scope hereof. In some embodiments, first communication device 102 is one of (a) a wireless base station, e.g. a long-term evolution (LTE) wireless base station (e.g., an eNB device), a fifth-generation (5G) new radio (NR) wireless base station (e.g., a gNB device), an Integrated Access Backhaul (IAB) base station, a sixth-generation (6G) wireless base station, a Wi-Fi wireless base station (e.g., including unscheduled, partially scheduled, and scheduled systems), a satellite wireless base station, or variations and/or extensions thereof, (b) a modem termination system, e.g. a cable modem termination system (CMTS), a wireless core (such as a mobile core, a Wi-Fi core, a converged core, etc.), a DSLAM, etc., (c) an optical line terminal (OLT), e.g. operating according to a ethernet passive optical network (EPON) protocol, a radio frequency over glass (RFOG) protocol, or a gigabit passive optical network (GPON) protocol, (d) an access device, e.g. a cable modem, such as operating according to a data over cable service interface specification (DOCSIS) protocol, a DSL modem, or an optical network unit (ONU) or an optical network terminal (ONT), such as operating according to an EPON protocol, a RFOG protocol, or a GPON protocol, a wireless access device (including, for example, eNBs, gNBs, and IAB access point, microcell, picocell, femtocell, macrocell, Wi-Fi Aps, etc), or (e) a UE device, e.g. a computer, a set-top device, a data storage device, an Internet of Things (IoT) device, an entertainment device, a computer networking device, a mobile telephone, a smartwatch, a wearable device with wireless capability, a medical device, etc. In some embodiments, first communication device 102 is part of another device, and first communication device 102 may share one or more components, e.g. processing subsystem 110 and/or memory subsystem 112, with such other device.

Second communication device 104 includes a receiving subsystem 116, a processing subsystem 118, and a memory subsystem 120. Receiving subsystem 116 is configured to receive signals from transmitting subsystem 108 via communication channels 106. In some embodiments, receiving subsystem 116 is also configured to generate signals, called, for example, a transceiving subsystem. Processing subsystem 118 is configured to execute instructions 122 stored in memory subsystem 120 to control at least some aspects of second communication device 104. Instructions 122 include, for example, software and/or firmware.

Although each of receiving subsystem 116, processing subsystem 118, and memory subsystem 120 is symbolically shown as a single element, one or more of these elements may include a plurality of constituent sub-elements. For example, receiving subsystem 116 could include a plurality of receivers, processing subsystem 118 could include a plurality of processors, and memory subsystem 120 could include a plurality of memory modules. Additionally, the elements and sub-elements of second communication device 104 could be distributed in multiple locations. For example, processing subsystem 118 could include multiple processors, either co-located or distributed, and memory subsystem 120 could include multiple memory devices, either co-located or distributed.

Second communication device 104 may include additional elements without departing from the scope hereof. In some embodiments, second communication device 104 is part of one of (a) a modem termination system, e.g. a CMTS or a DSLAM, (b) an OLT, e.g. operating according to a EPON protocol, a RFOG protocol, or a GPON protocol, (c) an access device, e.g. a modem, such as operating according to a DOCSIS protocol, a DSL modem, or an ONU or ONT, such as operating according to an EPON protocol, a RFOG protocol, or a GPON protocol, (d) a UE device, e.g. a computer, a set-top device, a data storage device, an IoT device, an entertainment device, a wireless access point (including, for example, eNBs, gNBs, and Wi-Fi APS acting as UEs), a computer networking device, a mobile telephone, a smartwatch, a wearable device with wireless capability, and a medical device, (e) a wireless base station, e.g. a LTE wireless base station (e.g., an eNB device), a 5G NR wireless base station (e.g., a gNB device), a 6G wireless base station, a Wi-Fi base station (e.g., including unscheduled, partially scheduled, and unscheduled systems), a satellite wireless base station, or variations and/or extensions thereof, or (f) an array of wireless base stations. In some embodiments, second communication device 104 is part of another device, and second communication device 104 may share one or more components, e.g. processing subsystem 118 and/or memory subsystem 120, with such other device.

Referring again to first communication device 102, in some embodiments, processing subsystem 110 is configured to execute instructions 114 to control transmitting subsystem 108 to automatically allocate communication resources (e.g., transmission power and/or communication capacity) among communication channels 106 in a manner that helps maximize return (e.g., data throughput) and/or minimize risk (e.g., variation in data throughput). For example, in some embodiments, processing subsystem 110 is configured to execute instructions 114 to perform method 200 of FIG. 2 for dynamic allocation of communication resources. In a block 202 of method 200, processing subsystem 110 executes instructions 114 to determine a risk-return characterization of a plurality of communication resource allocations. In some embodiments, the risk-return characterization includes a respective risk and a respective return for each communication resource allocation. Each return is, for example, total data throughput of all communication channels 106, and each risk is, for example, a variation in total data throughput of all communication channels 106. Each communication resource allocation specifies how one or more communication resources are allocated among communication channels 106. For example, in some embodiments, each communication resource allocation specifies how a total transmission power is allocated among communication channels 106, and in some other embodiments, each communication resource allocation specifies how total communication capacity is allocated among communication channels 106. In some embodiments, processing subsystem 110 executes instructions 114 to randomly generate the plurality of communication resource allocations.

The number of communication resource allocations considered in block 202 is chosen, for example, to achieve a desired trade-off between optimization of communication resource allocation and minimization of processing time. Determining a risk-return characterization of many communication resource allocations in block 202 promotes optimization of communication resource allocation, while determining a risk-return characterization of few communication resource allocations in block 202 helps minimize load on processing subsystem 110.

Table 1 below illustrates one example of a risk-return characterization determined in block 202, in an embodiment where there are three communication channels 106 (N=3) and a risk-return characterization is determined for fourteen communication resource allocations $A_1, A_2, A_3, \ldots A_{14}$. Each communication resource allocation $A_i$ corresponds to a particular set of weights, i.e. $A_i = \{W_{i1}, W_{i2}, W_{i3}\}$, where the letter "i" is an index which ranges from 1 to 14 and corresponds to a particular communication resource allocation. $W_{i1}$, $W_{i2}$, and $W_{i3}$ represent a portion of total communication resources allocated to communication channels 106(1), 106(2), and 106(3), respectively. For example, communication resource allocation $A_1$ corresponds to 10%, 10%, and 80% of total communication resources being allocated to communication channels 106(1), 106(2), and 106(3), respectively. Accordingly, if the communication resource being allocated is 1.0 watts of total transmission power, 0.1 watt, 0.1 watt, and 0.8 watt of transmission power would be allocated to communication channels 106(1), 106(2), and 106(3), respectively, under communication resource allocation $A_1$. As another example, communication resource allocation $A_2$ corresponds to 10%, 40%, and 50% of total communication resources being allocated to communication channels 106(1), 106(2), and 106(3), respectively. Accordingly, if the communication resource being allocated is 1.0 watts of total transmission power, 0.1 watt, 0.4 watt, and 0.5 watt of transmission power would be allocated to communication channels 106(1), 106(2), and 106(3), respectively, under communication resource allocation $A_2$. It should be appreciated, however, that communication resources other than transmission power may be considered in block 202. For example, in another embodiment, the plurality of communication resource allocations specify how total communication system capacity is allocated among communication channels 106.

Processing subsystem 110 executes instructions 114 to determine a respective return ($R_i$) and a respective risk ($V_i$) for each communication resource allocation $A_i$ in the example of Table 1. For example, processing subsystem 110 determines that return $R_1$ and risk $V_1$ for communication resource allocation $A_1$ are 0.650 and 0.600, respectively, and processing subsystem 110 determines that the return $R_2$ and risk $V_2$ for communication resource allocation $A_1$ are 0.600 and 0.500, respectively. $R_i$ represents total data throughput of all communication channels 106 using communication resource allocation $A_i$, and $V_i$ represents variation in total data throughput of all communication channels 106 using communication resource allocation $A_i$. In some embodiments, processing subsystem 110 executes instructions 114 to determine return $R_i$ and risk $V_i$ from EQNS. 1 and 2, below respectively.

$$R_i = \Sigma_{a=1}^{N} W_{ia} E_{ia} \qquad (\text{EQN. 1})$$

$$V_i = \Sigma_{a=1}^{N} W_{ia}^2 \sigma_{ia}^2 + \Sigma_{a=1}^{N} \Sigma_{b=1 \neq a}^{N} W_{ia} W_{ib} \sigma_{ia} \sigma_{ib} \rho_{iab} \qquad (\text{EQN. 2})$$

In EQN. 1, $E_{ia}$ is an expected return, e.g. data throughput, for communication channel 106(a) with communication resource allocation $A_i$, where 'a' ranges from 1 to N. N is the number of communication channels 106 in communication system 100, as stated above. In some embodiments, processing subsystem 110 executes instructions 114 to determine $E_{ia}$ from historical performance data of communication system 100, e.g. at least partially based on performance data determined by second communication device 104 and transmitted to first communication device 102. In EQN. 2, $\sigma_{ia}$ is variation in return for communication channel 106(a) with communication resource allocation $A_i$, and $\sigma_{ib}$ is variation in return for communication channel 106(b) with communication resource allocation $A_i$. Each of a and b ranges from 1 to N in EQN. 2. $\rho_{iab}$ is the correlation coefficient between communication channels 106(a) and 106(b) with communication resource allocation $A_i$. In some embodiments, processing subsystem 110 executes instructions 114 to determine $\sigma_{ia}$, $\sigma_{ib}$, and $\rho_{iab}$ from historical performance data of communication system 100, e.g. at least partially based on performance data determined by second communication device 104 and transmitted to first communication device 102.

TABLE 1

| Allocation | $W_{i1}$ | $W_{i2}$ | $W_{i3}$ | $R_i$ | $V_i$ |
|---|---|---|---|---|---|
| $A_1$ | 10% | 10% | 80% | 0.650 | 0.600 |
| $A_2$ | 10% | 40% | 50% | 0.600 | 0.500 |
| $A_3$ | 20% | 10% | 70% | 0.600 | 0.675 |
| $A_4$ | 20% | 30% | 50% | 0.450 | 0.650 |
| $A_5$ | 40% | 30% | 30% | 0.525 | 0.400 |
| $A_6$ | 50% | 30% | 20% | 0.500 | 0.425 |
| $A_7$ | 40% | 10% | 50% | 0.500 | 0.600 |
| $A_8$ | 40% | 50% | 10% | 0.400 | 0.400 |
| $A_9$ | 70% | 10% | 20% | 0.350 | 0.500 |
| $A_{10}$ | 70% | 20% | 10% | 0.425 | 0.300 |
| $A_{11}$ | 80% | 10% | 10% | 0.250 | 0.300 |
| $A_{12}$ | 100% | 0 | 0 | 0.300 | 0.250 |
| $A_{13}$ | 0 | 100% | 0 | 0.525 | 0.475 |
| $A_{14}$ | 0 | 0 | 100% | 0.675 | 0.700 |

Figure 3:
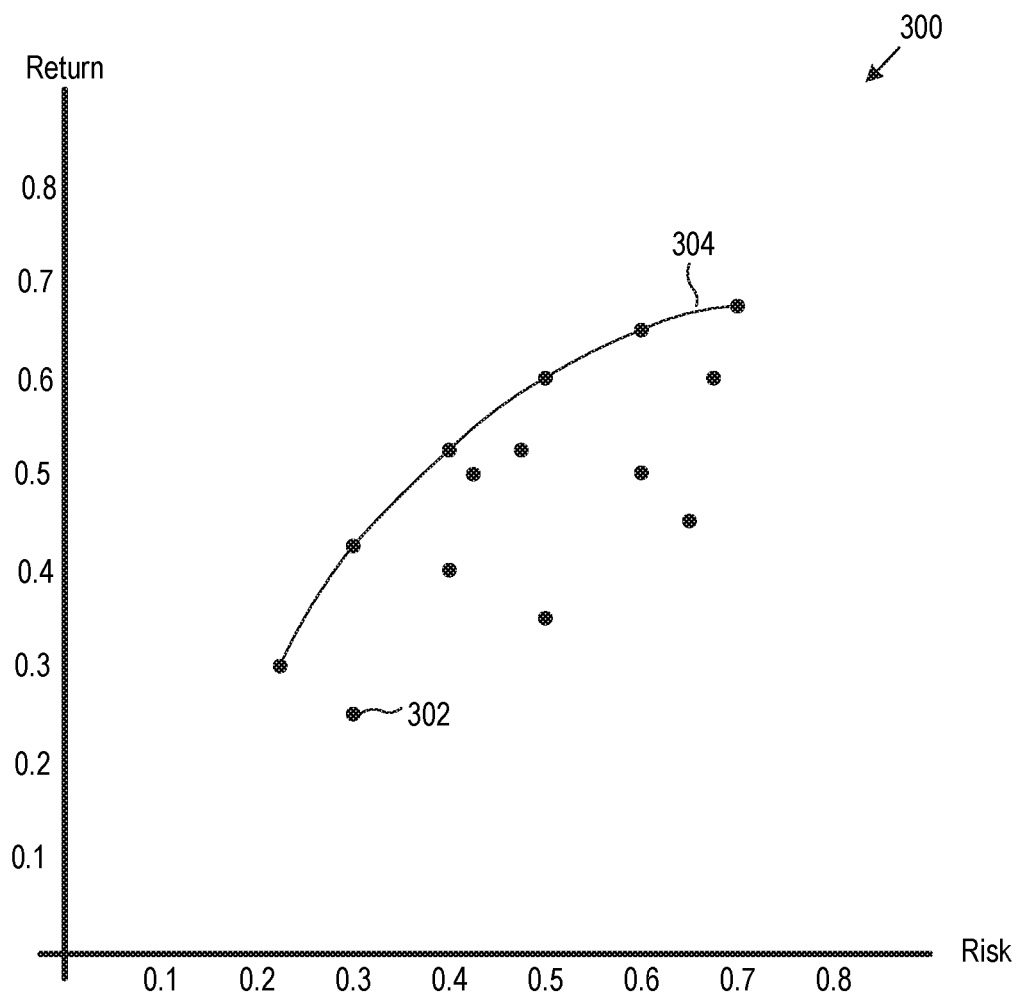
FIG. 3 is an example graph of return as a function of risk, according to an embodiment.

FIG. 3 is a graph 300 of return as a function of risk from the data of Table 1. Each point on graph 300 corresponds to a respective value of $R_i$ and $V_i$ for a particular communication resource allocation $A_i$ of Table 1. For example, point 302 corresponds to a return of 0.250 and a risk of 0.300 for communication resource allocation $A_1$. The remaining points are not labeled in FIG. 3 to promote illustrative clarity.

It can be observed from FIG. 3 that more than one possible return $R_i$ may be realized at a given risk $V_i$. Similarly, there may be more than one possible risk $V_i$ at a given return $R_i$. Curve 304 represents a maximum return $R_i$ that may be achieved for a given risk $V_i$ among communication resource allocations $A_1$, $A_2$, $A_3$, . . . . $A_{14}$. Curve 304 also represents a minimum risk $V_i$ that be realized at a given return $R_i$ among communication resource allocations $A_1$, $A_2$, $A_3$, . . . . $A_{14}$. Curve 304 may be referred to as an efficiency frontier.

Referring again to FIG. 2, in block 204, processing subsystem 110 executes instructions 114 to select a first allocation of the plurality of communication resource allocations from the risk-return characterization, according to at least one predetermined criterium. In some embodiments, the predetermined criterium is either a maximum return that can be achieved at a given risk or a minimum risk that can be realized at a given return. For example, assume that the predetermined criterium is to achieve maximum return at a risk of 0.500, given the scenario discussed above with respect to Table 1. The first allocation would be communication resource allocation $A_2$ because this communication resource allocation is on the efficiency frontier and achieves a maxim return (0.600) at a risk of 0.500, as can be seen in FIG. 3. As another example, assume that the predetermined criterium is to realize a minimum risk at a return of 0.525, assuming the scenario discussed above with respect to FIG. 1. The first allocation would be communication resource allocation $A_5$ because this communication resource allocation is on the efficiency frontier and achieves a minimum risk (0.400) at a return of 0.525, as can be seen in FIG. 3. Such selection of a communication resource allocation from a risk-return characterization advantageously accounts for stochastic properties of communication channels 106 when determining a communication resource allocation.

In block 206, processing subsystem 110 executes instructions 114 to automatically allocate communication resources among the plurality of communication channels according to the first allocation. For example, assume that communication resource allocation $A_2$ of Table 1 is selected as the first allocation in block 204. In this example, processing subsystem 110 executes instructions 114 to automatically allocate communication resources among communication channels 106(1), 106(2), 106(3) according to set of weights {10%, 40%, 50%} of communication resource allocation $A_2$. For example, if the communication resource to be allocated is a of 0.5 watt of total transmission power, processing subsystem 110 executes instructions 114 to control transmitting subsystem 108 such that 0.05 watt, 0.20 watt, and 0.25 watt are allocated to communication channels 106(1), 106(2), 106(3), respectively. As another example, if the communication resource to be allocated is a total communication capacity of 10 Gigabits (Gb) per second (s) for communication system 100, processing subsystem 110 executes instructions 114 to control transmitting subsystem such that 1.0 Gb/s, 4.0 Gb/s, and 5.0 Gb/s are allocated to communication channels 106(1), 106(2), 106(3), respectively. Accordingly, execution of method 200 may result in allocation of communication resources among communication channels in a manner which corresponds to an efficiency frontier, thereby helping optimize allocation of the communication resources.

Table 2 below illustrates another example of a risk-return characterization determined in block 202 by processing subsystem 110 executing instructions 114, in an embodiment where there are four communication channels 106 (N=4) and a risk-return characterization is determined for fifteen communication resource allocations $A_1$, $A_2$, $A_3$, . . . . $A_{15}$. Analogous to Table 1, each communication resource allocation $A_i$ in Table 2 corresponds to a particular set of weights, i.e. $A_i = \{W_{i1}, W_{i2}, W_{i3}, W_{i4}\}$, where the letter "i" is an index which ranges from 1 to 15 and corresponds to a particular communication resource allocation. $W_{i1}$, $W_{i2}$, $W_{i3}$, $W_{i4}$ represent a portion of total communication resources allocated to communication channels 106(1), 106 (2), 106(3), and 106(4), respectively. Additionally, $R_i$ corresponds to respective return, and $V_i$ corresponds to respective risk, for communication resource allocation $A_i$ in a manner like that discussed above with respect to Table 1.

TABLE 2

| Allocation | $W_{i1}$ | $W_{i2}$ | $W_{i3}$ | $W_{i4}$ | $R_i$ | $V_i$ |
|---|---|---|---|---|---|---|
| $A_1$ | 10% | 30% | 20% | 40% | 0.100 | 0.325 |
| $A_2$ | 15% | 25% | 40% | 20% | 0.225 | 0.175 |
| $A_3$ | 20% | 40% | 10% | 30% | 0.525 | 0.400 |
| $A_4$ | 15% | 25% | 30% | 30% | 0.125 | 0.250 |
| $A_5$ | 17% | 23% | 25% | 35% | 0.600 | 0.500 |
| $A_6$ | 30% | 30% | 15% | 25% | 0.300 | 0.300 |
| $A_7$ | 30% | 30% | 20% | 20% | 0.300 | 0.200 |
| $A_8$ | 25% | 35% | 20% | 20% | 0.425 | 0.300 |
| $A_9$ | 35% | 40% | 20% | 5% | 0.375 | 0.475 |
| $A_{10}$ | 40% | 20% | 10% | 30% | 0.225 | 0.400 |
| $A_{11}$ | 40% | 25% | 15% | 20% | 0.425 | 0.400 |
| $A_{12}$ | 25% | 10% | 30% | 35% | 0.675 | 0.700 |
| $A_{13}$ | 38% | 25% | 17% | 20% | 0.525 | 0.500 |
| $A_{14}$ | 30% | 50% | 5% | 15% | 0.650 | 0.600 |
| $A_{15}$ | 25% | 25% | 25% | 25% | 0.575 | 0.600 |

Figure 4:
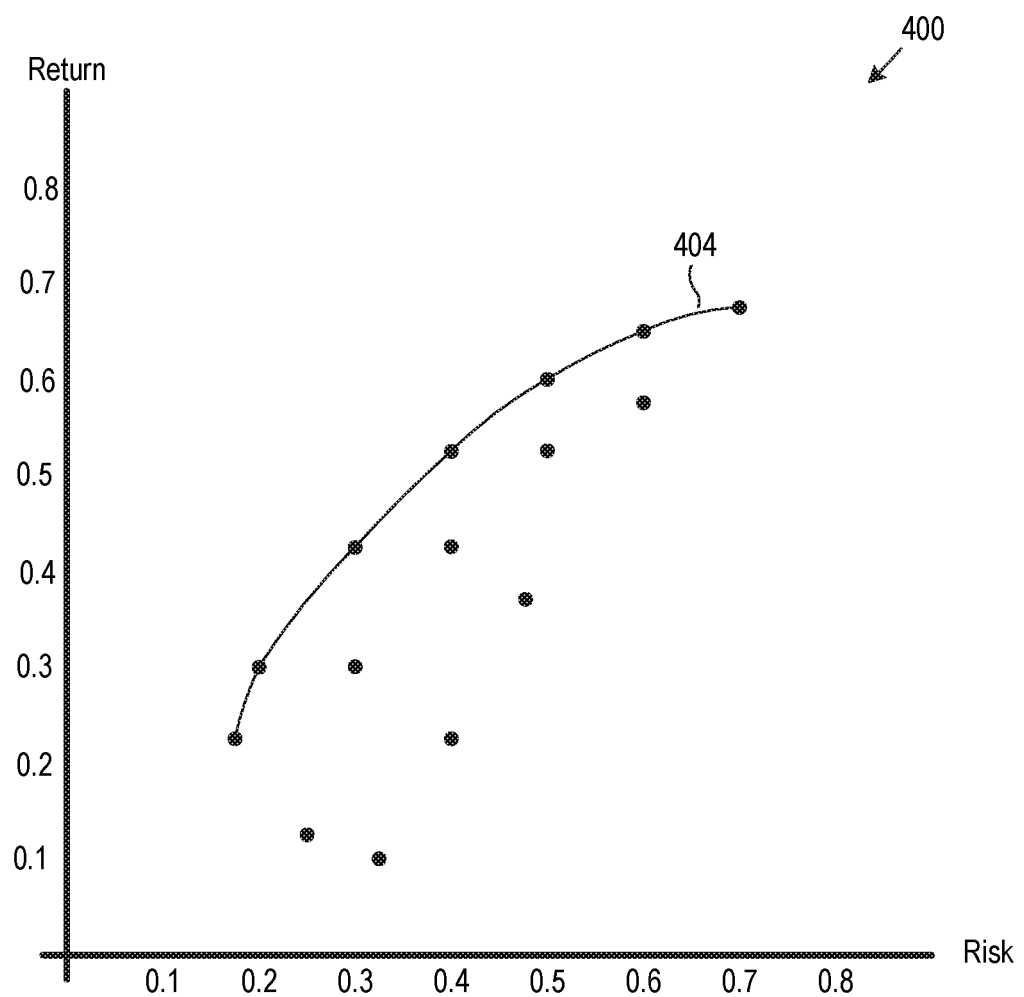
FIG. 4 is another example graph of return as a function of risk, according to an embodiment.

FIG. 4 is a graph 400 of return as a function of risk from the data of Table 2, and curve 404 represents an efficiency frontier of the risk-return characterization of Table 2. Processing subsystem 110 executes instructions 114 to (a) select a first allocation of the plurality of communication resource allocations from the risk-return characterization of Table 2 and (b) automatically allocate communication resources among the plurality of communication channels 106 according to the determined first allocation, in a manner similar to that discussed above with respect to Table 1. For example, if the predetermined criterium is to achieve minimum risk at a return of 0.250, processing subsystem 110 executes instructions 114 to (a) to select resource allocation $A_2$ as the first allocation, because this resource allocation is on the efficiency frontier 404 and achieves a minimum risk (0.175) at a return of 0.250, and (b) automatically allocate communication resources among communication channels 106 according to resource allocation $A_2$.

In some embodiments, first communication device 102 is configured to execute instructions 114 to perform method 200 periodically and/or in response to a change in operating conditions of communication system 100. Such repeated performance of method 200 advantageously helps communication system 100 adapt to changes in its operating environment, thereby promoting high-performance of communication system 100 under dynamic conditions.

In some embodiments, processing subsystem 118 is further configured to execute instructions 122 to automatically allocate communication resources (e.g., transmission power and/or communication capacity) among communication channels which transfer data from second communication device 104 to first communication device 102, in a manner which helps maximize return (e.g., data throughput) and/or minimize risk (e.g., variation in data throughput). In some of these embodiments, communication channels 106 are bidirectional such that both downlink and uplink data may be transmitted between first communication device 102 and second communication device 104. In some other embodiments, communication channels (not shown) in addition to communication channels 106 are used to transfer uplink data. Downlink data is data transferred from first communication device 102 to second communication device 104, and uplink data is data transferred from second communication device 104 to first communication device 102. In some embodiments, processing subsystem 118 is configured to execute instructions 122 to perform a method similar to method 200 of FIG. 2, to automatically allocate communication resources (e.g., transmission power and/or communication capacity) among uplink communication channels.

Figure 5:
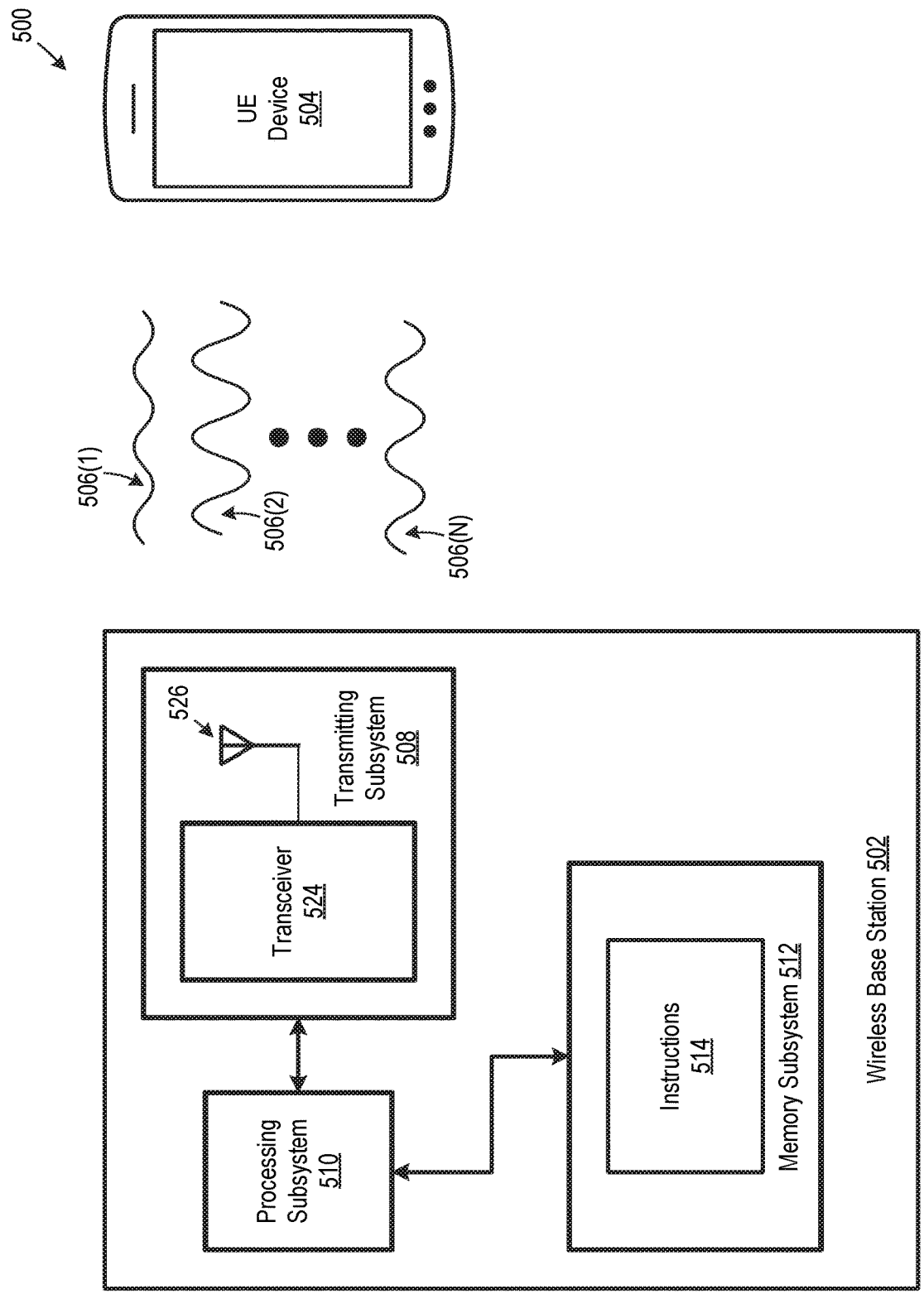
FIG. 5 is a block diagram of a communication system configured to dynamically allocate communication resources including a wireless base station and a user equipment (UE) device, according to an embodiment.

FIG. 5 is a block diagram of a communication system 500, which is one embodiment of communication system 100 (FIG. 1) where (a) first communication device 102 is embodied as a wireless base station 502 and (b) second communication device 104 is embodied as a UE device 504. Wireless base station 502 is, for example, a LTE wireless base station (e.g., an eNB device), a 5G NR wireless base station (e.g., a gNB device), a 6G wireless base station, a Wi-Fi wireless base station (e.g., including unscheduled, partially scheduled, and unscheduled systems), a satellite wireless base station, or variations and/or extensions thereof. Although UE device 504 is depicted as a mobile phone, UE device 504 can take a different form, such as a computer, a set-top device, a data storage device, an IoT device, an entertainment device, a wireless access point (including, for example, eNBs, gNBs, and Wi-Fi APS acting as UEs), a computer networking device, a smartwatch, a wearable device with wireless capability, or a medical device.

Wireless base station 502 includes a transmitting subsystem 508, a processing subsystem 510, and a memory subsystem 512, which are embodiments of transmitting subsystem 108, processing subsystem 110, and memory subsystem 112, respectively. Transmitting subsystem 508 includes a transceiver 524 electrically connected to an antenna assembly 526. Transceiver 524 and antenna assembly 526 are collectively configured to generate a plurality (N) of radio frequency (RF) wireless subcarriers 506 of a multi-carrier modulation (MCM) signal in response to electrical or optical signals from processing subsystem 510. Wireless subcarriers 506 are embodiments of communication channels 106 of FIG. 1, and wireless subcarriers 506 wirelessly transmits information from wireless base station 502 to UE device 504. In some embodiments, transceiver 524 and antenna assembly 526 are also collectively configured to generate electrical or optical signals for processing subsystem 510 in response to RF signals received by antenna assembly 526, such as RF signals generated by UE device 504 for wirelessly transmitting information to wireless base station 502. Wireless subcarriers 506 are transmitted from wireless base station 502 to UE device 504, for example, through air and/or one or more other mediums capable of carrying wireless subcarriers 506. In certain embodiments, transmitting subsystem 508 is configured to generate wireless subcarriers 506 using an orthogonal frequency division multiplexing (OFDM) technique, such that wireless subcarriers 506 are orthogonal to each other. In some embodiments, transmitting subsystem 508 is configured to communicate with a plurality of UE devices (not shown) via wireless subcarriers 506.

Although FIG. 5 illustrates transmitting subsystem 508 as generating three or more wireless subcarriers 506, transmitting subsystem 508 may be configured to generate a different number of wireless subcarriers 506 without departing from the scope hereof. Additionally, wireless base station 502 is optionally configured such that the number of wireless subcarriers 506 generated by transmitting subsystem 508 is dynamically adjustable, such as a based on operating conditions of wireless base station 502 and/or configuration of UE device 504. Some or all of wireless subcarriers 506 may have a different form, such as a different amplitude, a different phase, a different shape (e.g. non-sinusoidal), and/or a different frequency, than the wireless subcarriers depicted in FIG. 5. For example, although FIG. 5 depicts wireless subcarriers 506 as having different respective amplitudes to show an example of dynamic allocation of transmission power among the wireless subcarriers (discussed below), wireless subcarriers 506 may have different amplitudes than those depicted in FIG. 5. As another example, although FIG. 5 illustrates wireless subcarriers 506 as being purely sinusoidal, i.e. having a single sinusoidal component, wireless subcarriers 506 could be composed of multiple components having different respective frequencies.

In particular embodiments, processing subsystem 510 is configured to execute instructions 514 stored in memory subsystem 512 to execute a method 600 for dynamic allocation of transmission power among wireless subcarriers. Method 600 is an embodiment of method 200 of FIG. 2 where the communication resource that is allocated is total transmission power of wireless base station 502. Instructions 514 include, for example, software and/or firmware.

In a block 602 of method 600, processing subsystem 510 executes instructions 514 to determine a risk-return characterization of a plurality of transmission power allocations among wireless subcarriers 506. In some embodiments, the risk-return characterization includes a respective risk and a respective return for each transmission power allocation. Each return is, for example, total data throughput of all wireless subcarriers 506, and each risk is, for example, a variation in total data throughput of all wireless subcarriers 506. Each transmission power allocation specifies how total transmission power of wireless base station 502 is allocated among wireless subcarriers 506. In some embodiments, processing subsystem 510 executes instructions 514 to randomly generate the plurality of transmission power allocations. The number of transmission power allocations considered in block 602 is chosen, for example, to achieve a desired trade-off between optimization of transmission power allocation and minimization of processing time.

Table 3 below illustrates one example of a risk-return characterization determined in block 602, in an embodiment where there are three wireless subcarriers 506 (N=3) and a risk-return characterization is determined for ten transmission power allocations $A_1, A_2, A_3, \ldots A_{10}$. Each transmission power allocation $A_i$ corresponds to a particular set of weights, i.e. $A_i=\{W_{i1}, W_{i2}, W_{i3}\}$, where the letter "i" is an index which ranges from 1 to 10 and corresponds to a particular transmission power allocation. $W_{i1}$, $W_{i2}$, and $W_{i3}$ represent a portion of total transmission power of wireless base station 502 allocated to wireless subcarriers 506(1), 506(2), and 506(3), respectively. For example, transmission power allocation $A_1$ corresponds to 10%, 20%, and 70% of total transmission power of wireless base station 502 being allocated to wireless subcarriers 506(1), 506(2), and 506(3), respectively. Accordingly, if the total transmission power being allocated is 1.0 watt, 0.1 watt, 0.2 watt, and 0.7 watt of transmission power would be allocated to wireless subcarriers 506(1), 506(2), and 506(3), respectively, under transmission power allocation $A_1$.

TABLE 3

| Allocation | $W_{i1}$ | $W_{i2}$ | $W_{i3}$ | $R_i$ | $V_i$ |
|---|---|---|---|---|---|
| $A_1$ | 10% | 20% | 70% | 0.650 | 0.600 |
| $A_2$ | 15% | 25% | 60% | 0.600 | 0.500 |
| $A_3$ | 21% | 37% | 42% | 0.600 | 0.675 |
| $A_4$ | 3% | 47% | 50% | 0.300 | 0.225 |
| $A_5$ | 60% | 27% | 13% | 0.525 | 0.400 |
| $A_6$ | 40% | 40% | 20% | 0.400 | 0.400 |
| $A_7$ | 81% | 9% | 10% | 0.525 | 0.475 |
| $A_8$ | 18% | 60% | 22% | 0.675 | 0.700 |
| $A_9$ | 53% | 27% | 20% | 0.350 | 0.500 |
| $A_{10}$ | 35% | 35% | 30% | 0.425 | 0.300 |

Figure 7:
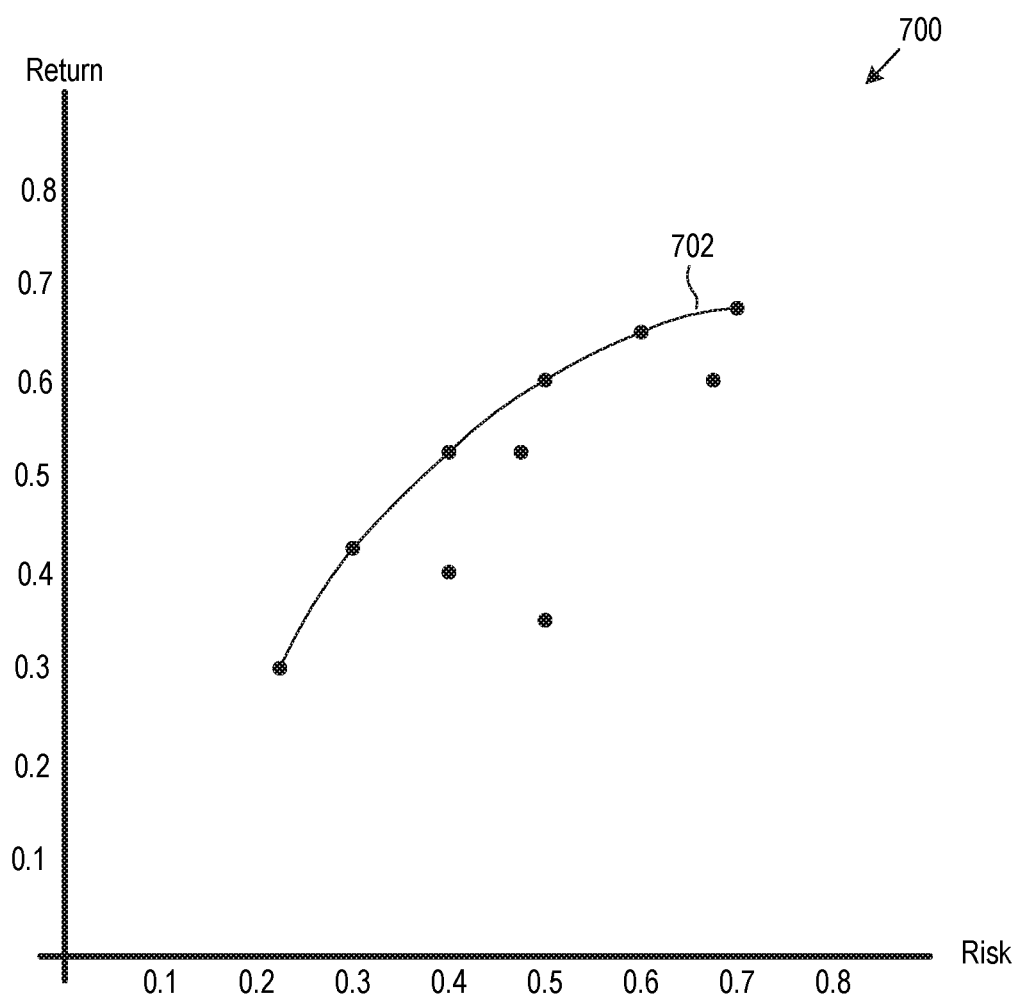
FIG. 7 is an example graph of return as a function of risk for an embodiment of the FIG. 5 communication system, according to an embodiment.

Processing subsystem 510 executes instructions 514 to determine a respective return ($R_i$) and a respective risk ($V_i$) for each transmission power allocation $A_i$ in the example of Table 3. For example, processing subsystem 510 determines that return $R_1$ and risk $V_1$ for transmission power allocation $A_1$ are 0.650 and 0.600, respectively, and processing subsystem 510 determines that the return $R_2$ and risk $V_2$ for transmission power allocation $A_2$ are 0.600 and 0.500, respectively. $R_i$ represents total data throughput of all wireless subcarriers 506 using transmission power allocation $A_i$, and $V_i$ represents variation in total data throughput of all wireless subcarriers 506 using transmission power allocation $A_i$. In some embodiments, processing subsystem 510 executes instructions 514 to determine return $R_i$ and risk $V_i$ from EQNS. 1 and 2 above, respectively. FIG. 7 is a graph 700 of return as a function of risk for the data of table 3, which has an efficiency frontier 702.

Figure 6:
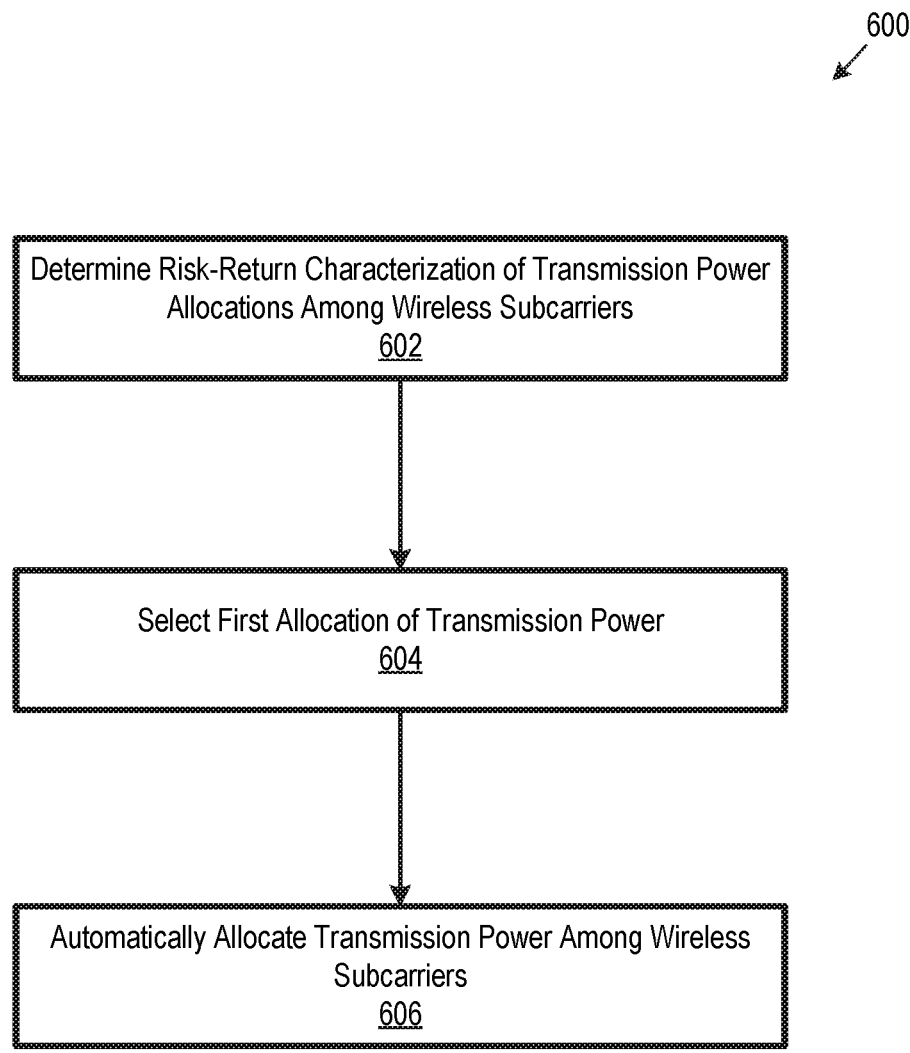
FIG. 6 is a flow chart illustrating a method for dynamic allocation of transmission power among wireless subcarriers, according to an embodiment.

Referring again to FIG. 6, in block 604, processing subsystem 510 executes instructions 514 to select a first allocation of the plurality of transmission power allocations from the risk-return characterization according to at least one predetermined criterium. In some embodiments, the predetermined criterium is either a maximum return that can be achieved at a given risk or a minimum risk that can be realized at a given return. For example, assume that the predetermined criterium is to achieve maximum return at a risk of 0.400, given the scenario discussed above with respect to Table 3. The first allocation would be transmission power allocation $A_5$ because this transmission power allocation is on the efficiency frontier and achieves a maxim return (0.525) at a risk of 0.400, as can be seen in FIG. 7. As another example, assume that the predetermined criterium is to realize a minimum risk at a return of 0.600. The first allocation would be transmission power allocation $A_2$ because this transmission power allocation is on the efficiency frontier and achieves a minimum risk (0.500) at a return of 0.600, as can be seen in FIG. 7.

In block 606, processing subsystem 510 executes instructions 514 to automatically allocate transmission power among the plurality of wireless subcarriers 506 according to the first allocation. For example, assume that communication resource allocation $A_2$ of Table 3 is selected as the first allocation in block 604. In this example, processing subsystem 510 executes instructions 514 to automatically allocate transmission power among wireless subcarriers 506(1), 506(2), 506(3) according to set of weights {15%, 25%, 60%} of transmission power allocation $A_2$. For example, if the total transmission power of wireless base station 502 is 0.5 watt, processing subsystem 510 executes instructions 514 to control transmitting subsystem 508 such that 0.075 watt, 0.125 watt, and 0.300 watt are allocated to wireless subcarriers 506(1), 506(2), 506(3), respectively. Processing subsystem 510 is optionally further configured to execute instructions 514 to set modulation format, e.g. modulation order, of each wireless subcarrier 506 as a function of transmission power allocated to the wireless subcarrier 506. Accordingly, allocating total transmission power using method 600 promotes high-capacity of wireless base station 502 while helping minimize fluctuation in capacity.

In some embodiments, processing subsystem 510 is configured to execute instructions 514 to perform method 600 periodically and/or in response to a change in operating conditions of communication system 500. Such repeated performance of method 600 advantageously helps communication system 500 adapt to changes in its operating environment, such as due to interference from other wireless base stations, thereby promoting high-performance of communication system 500 under dynamic conditions.

UE device 504 is optionally configured to allocate transmission power among wireless subcarriers (not shown) transmitted from UE device 504 to wireless base station 502, in a manner similar to that discussed above with respect to FIG. 6. For example, in some embodiments, UE device 504 is configured to execute a variation of method 600 where the transmission power to be allocated is total transmission power of UE device 600, instead of total transmission power of wireless base station 500.

Figure 8:
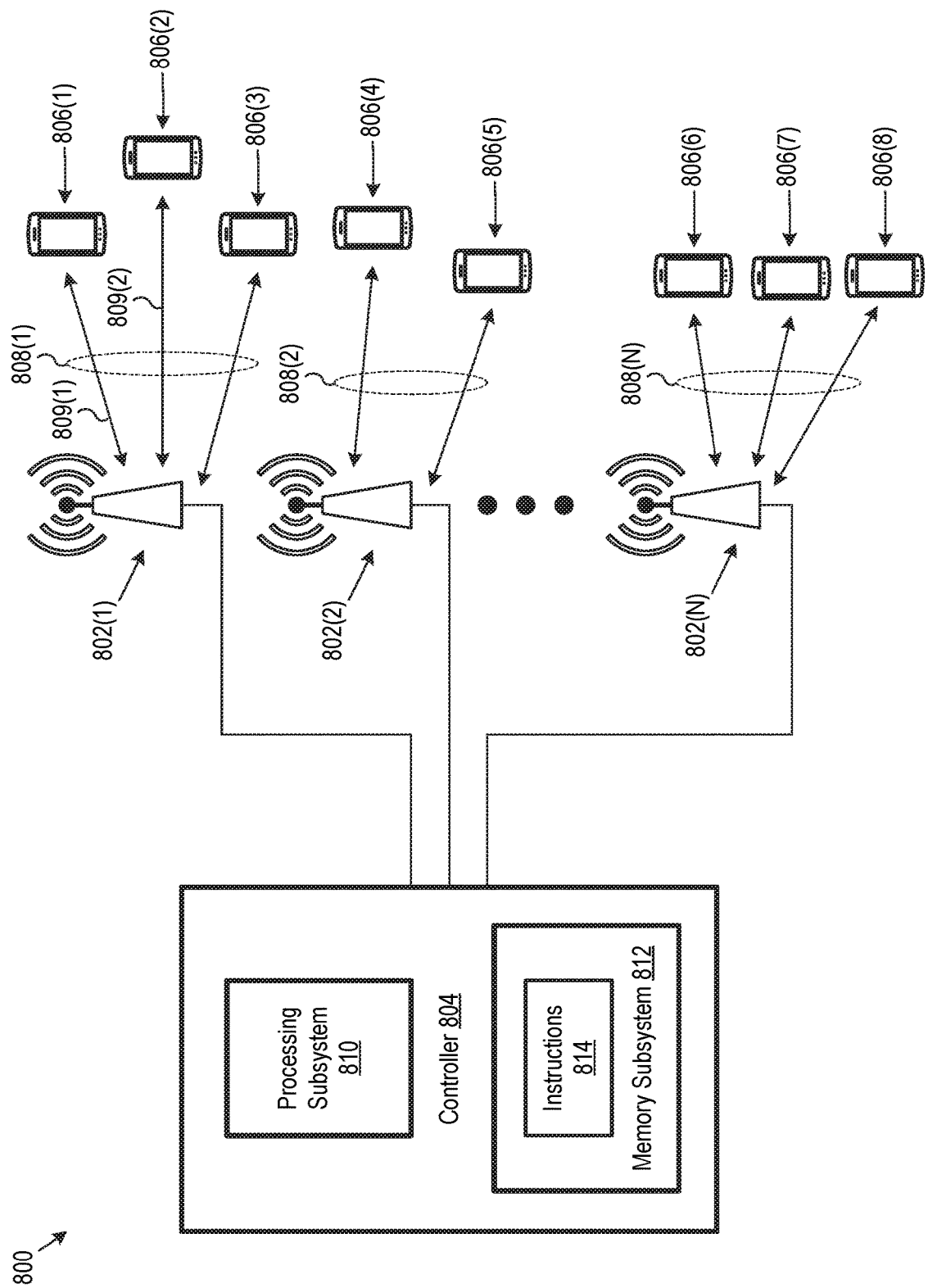
FIG. 8 is a block diagram of a communication system including a plurality of wireless base stations and configured to dynamically allocate communication resources, according to an embodiment.

The methods discussed above for dynamic allocation of communication resources can be applied to allocate communication resources among multiple devices in a system, e.g. among multiple wireless access points in an array of wireless access points. For example, FIG. 8 is a block diagram of a communication system 800 including a plurality of wireless base stations and configured to dynamically allocate transmission power. Communication system 800 includes a plurality (N) of wireless base stations 802 and a controller 804. Each wireless base station 802 is, for example, a LTE wireless base station (e.g., an eNB device), a 5G NR wireless base station (e.g., a gNB device), a 6G wireless base station, a Wi-Fi wireless base station (e.g., including unscheduled, partially scheduled, and unscheduled systems), a satellite wireless base station, or variations and/or extensions thereof. Although FIG. 8 illustrates communication system 800 as including three or more wireless base stations 802, communication system 800 could include only two wireless base stations 802 without departing from the scope hereof.

Each wireless base station 802 is configured to communicate with one or more UE devices 806 via a respective wireless communication channel 808. For example, wireless base station 802(1) communicates with UE devices 806(1)-(3) via a wireless communication channel 808(1), and wireless base station 802(2) communicates with UE devices 806(4)-(5) via a wireless communication channel 808(2). Accordingly, wireless communication channels 806 are embodiments of communication channels 106 of FIG. 1. Each wireless communication channel 808 includes wireless signals, symbolically shown by arrows 809, transmitted between respective a wireless base station 802 and one or more UE devices 806. The wireless signals are transmitted, for example, through air and/or one or more other mediums capable of carrying wireless signals. In some embodiments, the wireless signals are generated by wireless base stations 802 and/or UE devices 806 using OFDM techniques. Only two arrows 809 are labeled in FIG. 8 to promote illustrative clarity.

Although UE devices 806 are depicted as mobile phones, one or more UE devices 806 could take a different form, such as a computer, a set-top device, a data storage device, an IoT device, an entertainment device, a wireless access point (including, for example, eNBs, gNBs, and Wi-Fi APS acting as UEs), a computer networking device, a smartwatch, a wearable device with wireless capability, or a medical device. The number of UE devices 806 being served by communication system 800, as well as the number of UE devices 806 being served by each wireless base station 802, may vary without departing from the scope hereof UE devices 806 are not necessarily part of communication system 800.

Controller 804 includes a processing subsystem 810 and a memory subsystem 812. Processing subsystem 810 is configured to execute instructions 814 stored in memory subsystem 812 to control at least some aspects of communication system 800. Instructions 814 include, for example, software and/or firmware. Although wireless base stations 802, processing subsystem 810, and memory subsystem 812 are each symbolically shown as a single element, one or more of these elements may include a plurality of constituent sub-elements. For example, processing subsystem 810 could include a plurality of processors, and memory subsystem 812 could include a plurality of memory modules. As another example, one or more wireless base stations 802 could include an antenna assembly that is remote from a radio control device. Additionally, the elements and sub-elements of communication system 800 could be distributed in multiple locations. For example, processing subsystem 810 could include multiple processors distributed among two or more data centers, and memory subsystem 812 could include multiple memory devices distributed among a plurality of data centers. Furthermore, two or more elements of communication system 800 could be combined. For example, controller 804 could be incorporated in one wireless base station 802 instance, or controller 804 could be a distributed controller collectively incorporated in multiple wireless base station 802 instances.

Figure 9:
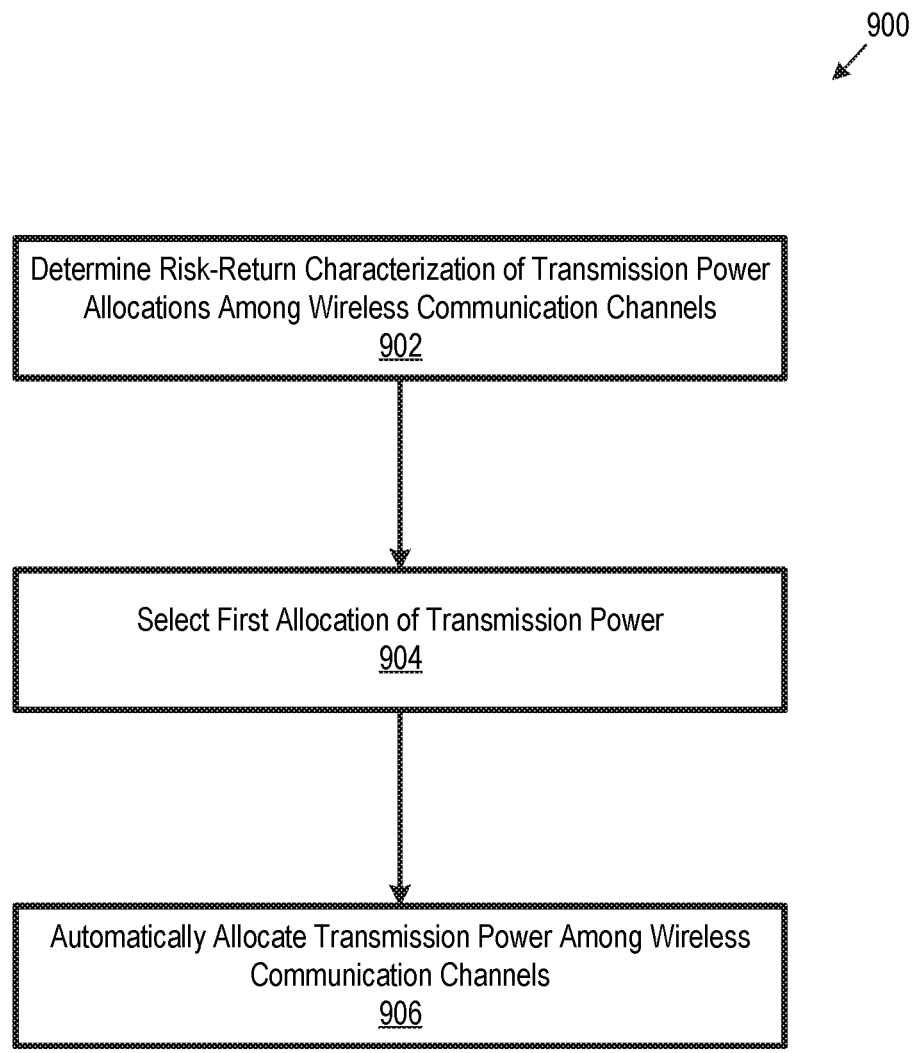
FIG. 9 is a flow chart illustrating a method for dynamic allocation of transmission power among wireless communication channels, according to an embodiment.

In particular embodiments, processing subsystem 810 is configured to execute instructions 814 to execute a method 900 for dynamic allocation of transmission power among wireless communication channels 808. FIG. 9 is a flow chart illustrating method 900.

In a block 902 of method 900, processing subsystem 810 executes instructions 814 to determine a risk-return characterization of a plurality of transmission power allocations among wireless communication channels 808. In some embodiments, the risk-return characterization includes a respective risk and a respective return for each transmission power allocation. Each return is, for example, total data throughput of all wireless communication channels 808, and each risk is, for example, a variation in total data throughput of all wireless communication channels 808. Each transmission power allocation specifies how a total transmission power of all wireless communication channels 808 is allocated among wireless communication channels 808. In some embodiments, processing subsystem 810 executes instructions 814 to randomly generate the plurality of transmission power allocations. The number of transmission power allocations considered in block 902 is chosen, for example, to achieve a desired trade-off between optimization of transmission power allocation and minimization of processing time.

Table 4 below illustrates one example of a risk-return characterization determined in block 902, in an embodiment where there are three wireless communication channels 808 (N=3) and a risk-return characterization is determined for ten transmission power allocations $A_1, A_2, A_3, \ldots A_{10}$. Each transmission power allocation $A_i$ corresponds to a particular set of weights, i.e. $A_i=\{W_{i1}, W_{i2}, W_{i3}\}$, where the letter "i" is an index which ranges from 1 to 10 and corresponds to a particular transmission power allocation. $W_{i1}$, $W_{i2}$, and $W_{i3}$ represent a portion of total transmission power of all wireless communication channels 808 allocated to wireless communication channels 808(1), 808(2), and 808(3), respectively. For example, transmission power allocation $A_1$ corresponds to 20%, 70%, and 10% of total transmission power of all wireless communication channels 808 being allocated to wireless communication channels 808(1), 808(2), and 808(3), respectively. Accordingly, if the total transmission power being allocated is 1.0 watt, 0.2 watt, 0.7 watt, and 0.1 watt of transmission power would be allocated to wireless communication channels 808(1), 808(2), and 808(3), respectively, under transmission power allocation $A_1$.

TABLE 4

| Allocation | $W_{i1}$ | $W_{i2}$ | $W_{i3}$ | $R_i$ | $V_i$ |
|---|---|---|---|---|---|
| $A_1$ | 20% | 70% | 10% | 0.300 | 0.225 |
| $A_2$ | 15% | 60% | 25% | 0.400 | 0.400 |
| $A_3$ | 42% | 37% | 21% | 0.525 | 0.600 |
| $A_4$ | 50% | 47% | 3% | 0.650 | 0.600 |
| $A_5$ | 60% | 27% | 13% | 0.525 | 0.400 |
| $A_6$ | 40% | 40% | 20% | 0.600 | 0.500 |
| $A_7$ | 10% | 9% | 81% | 0.300 | 0.300 |
| $A_8$ | 18% | 60% | 22% | 0.425 | 0.300 |
| $A_9$ | 20% | 27% | 53% | 0.400 | 0.500 |
| $A_{10}$ | 35% | 35% | 30% | 0.675 | 0.700 |

Figure 10:
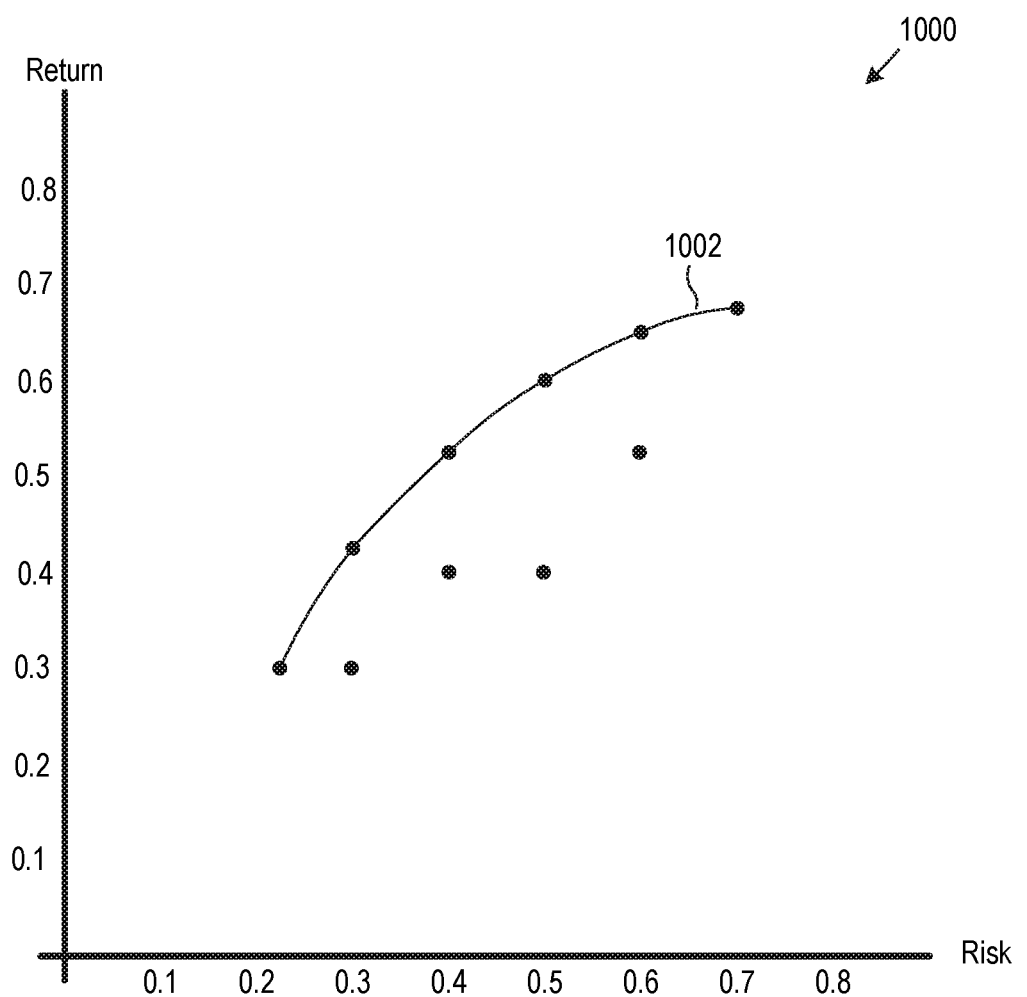
FIG. 10 is an example graph of return as a function of risk for an embodiment of the FIG. 8 communication system, according to an embodiment.

Processing subsystem 810 executes instructions 814 to determine a respective return ($R_i$) and a respective risk ($V_i$) for each transmission power allocation $A_i$ in the example of Table 4. For example, processing subsystem 810 determines that return $R_1$ and risk $V_1$ for transmission power allocation $A_1$ are 0.300 and 0.225, respectively, and processing subsystem 810 determines that the return $R_2$ and risk $V_2$ for transmission power allocation $A_2$ are 0.400 and 0.400, respectively. $R_i$ represents total data throughput of all wireless communication channels 808 using transmission power allocation $A_i$, and $V_1$ represents variation in total data throughput of all wireless communication channels 808 using transmission power allocation $A_i$. In some embodiments, processing subsystem 810 executes instructions 814 to determine return $R_i$ and risk $V_i$ from EQNS. 1 and 2 above, respectively. FIG. 10 is a graph 1000 of return as a function of risk for the data of Table 4, which has an efficiency frontier 1002.

Referring again to FIG. 9, in block 904, processing subsystem 810 executes instructions 814 to select a first allocation of the plurality of transmission power allocations from the risk-return characterization according to at least one predetermined criterium. In some embodiments, the predetermined criterium is either a maximum return that can be achieved at a given risk or a minimum risk that can be realized at a given return. For example, assume that the predetermined criterium is to achieve maximum return at a risk of 0.400, given the scenario discussed above with respect to Table 4. The first allocation would be transmission power allocation $A_5$ because this transmission power allocation is on the efficiency frontier and achieves a maximum return (0.525) at a risk of 0.400, as can be seen in FIG. 10. As another example, assume that the predetermined criterium is to realize a minimum risk at a return of 0.400. The first allocation would be transmission power allocation $A_2$ because this transmission power allocation is on the efficiency frontier and achieves a minimum risk (0.400) at a return of 0.400, as can be seen in FIG. 10.

In block 906, processing subsystem 810 executes instructions 814 to allocate transmission power among the plurality of wireless communication channels 808 according to the first allocation. For example, assume that communication resource allocation $A_2$ of Table 4 is selected as the first allocation in block 904. In this example, processing subsystem 810 executes instructions 814 to control wireless base stations 802 to automatically allocate transmission power among wireless communication channels 808(1), 808(2), 808(3) according to set of weights {15%, 60%, 25%} of transmission power allocation $A_2$. For example, if the total transmission power of all wireless communication channels 808 is 0.5 watt, processing subsystem 810 executes instructions 814 to control wireless base stations 802 such that 0.075 watt, 0.300 watt, and 0.125 watt are allocated to wireless communication channels 808(1), 808(2), 808(3), respectively. Accordingly, allocating total transmission power using method 900 promotes high-capacity of communication system 800 while helping minimize fluctuation in capacity.

In some embodiments, processing subsystem 810 is configured to execute instructions 814 to perform method 900 periodically and/or in response to a change in operating conditions of communication system 800. Such repeated performance of method 900 advantageously helps communication system 800 adapt to changes in its operating environment, such as due to interference from other wireless communication systems, thereby promoting high-performance of communication system 800 under dynamic conditions.

Features described above may be combined in various ways without departing from the scope hereof. The following examples illustrate some possible combinations:

(A1) A method for dynamic allocation of communication resources may include (1) determining a risk-return characterization of a plurality of communication resource allocations across a plurality of communication channels in a communication system, (2) selecting a first allocation of the plurality of communication resource allocations from the risk-return characterization according to at least one predetermined criterium, and (3) automatically allocating communication resources among the plurality of communication channels according to the first allocation.

(A2) In the method denoted as (A1), determining the risk-return characterization may include determining a respective risk value and a respective return value for each of the plurality of communication resource allocations.

(A3) In any one of the methods denoted as (A1) and (A2), each of the steps of determining, selecting, and automatically allocating may be at least partially performed by a processing subsystem executing instructions stored in a memory subsystem.

(A4) Any one of the methods denoted as (A1) through (A3) may further include periodically repeating the steps of determining, selecting, and automatically allocating.

(A5) Any one of the methods denoted as (A1) through (A3) may further include performing the steps of determining, selecting, and automatically allocating in response to a change in operation of the communication system.

(A6) In any one of the methods denoted as (A1) through (A5), the at least one predetermined criterium may include maximizing communication throughput at a predetermined risk according to an efficiency frontier of the risk-return characterization.

(A7) In any one of the methods denoted as (A1) through (A5), the at least one predetermined criterium may include minimizing risk at a predetermined communication throughput according to an efficiency frontier of the risk-return characterization.

(A8) In any one of the methods denoted as (A1) through (A7), the plurality of communication channels in the communication system may include a plurality of wireless subcarriers.

(A9) In the method denoted as (A8), automatically allocating communication resources among the plurality of communication channels according to the first allocation may include allocating a total transmission power of a wireless base station among the plurality of wireless subcarriers.

(A10) In any one of the methods denoted as (A8) and (A9), the wireless base station may be one of a fifth-generation (5G) new radio (NR) wireless base station, a sixth-generation (6G) wireless base station, a long-term evolution (LTE) wireless base station, and a Wi-Fi wireless base station.

(A11) In the method denoted as (A8), automatically allocating communication resources among the plurality of communication channels according to the first allocation may include allocating a total transmission power of a user equipment (UE) device among the plurality of wireless subcarriers.

(A12) In any one of the methods denoted as (A1) through (A7), each of the plurality of communication channels in the communication system may be a wireless communication channel of a respective wireless base station of a plurality of wireless base stations.

(A13) In the method denoted as (A12), automatically allocating communication resources among the plurality of communication channels according to the first allocation may include controlling the plurality of wireless base stations to allocate a total transmission power of the plurality of wireless base stations among the plurality of wireless communication channels.

(A14) In the method denoted as (A13), each of the plurality of wireless base stations may be one of a Wi-Fi wireless base station, a fifth-generation (5G) new radio (NR) wireless base station, a sixth-generation (6G) wireless base station, and a long-term evolution (LTE) wireless base station.

(A15) In any one of the methods denoted as (A1) through (A7), the plurality of communication channels in the communication system may include a plurality of wireline communication channels.

(B1) A communication device capable of dynamic allocation of communication resources may include (1) a transmitting subsystem configured to generate a plurality of signals for transmission via respective communication channels of a plurality of communication channels, (2) a memory subsystem, and (3) a processing subsystem configured to execute instructions stored in the memory subsystem to (a) determine a risk-return characterization of a plurality of communication resource allocations across the plurality of communication channels, (b) select a first allocation of the plurality of communication resource allocations from the risk-return characterization according to at least one predetermined criterium, and (c) automatically allocate communication resources among the plurality of communication channels according to the first allocation.

(B2) In the communication device denoted as (B1), (a) the communication device may be a wireless base station, (b) the transmitting subsystem may include a transceiver and an antenna assembly collectively configured to generate a plurality of wireless subcarriers as the plurality of signals, and (c) the processing system may be configured to execute instructions stored in the memory subsystem to automatically allocate communication resources among the plurality of communication channels according to the first allocation by allocating a total transmission power of the wireless base station among the plurality of wireless subcarriers.

(B3) In any one of the communication devices denoted as (B1) and (B2), the wireless base station may be one of a fifth-generation (5G) new radio (NR) wireless base station, a sixth-generation (6G) wireless base station, a long-term evolution (LTE) wireless base station, and a Wi-Fi wireless base station.

(C1) A communication system capable of dynamic allocation of communication resources may include (1) a plurality of wireless base stations configured to communicate via respective wireless communication channels of a plurality of wireless communication channels and (2) a controller configured to (a) determine a risk-return characterization of a plurality of transmission power allocations across the plurality of wireless communication channels, (b) select a first allocation of the plurality of transmission power allocations from the risk-return characterization according to at least one predetermined criterium, and (c) automatically allocate transmission power among the plurality of wireless communication channels according to the first allocation.

(C2) In the communication system denoted as (C1), each of the plurality of wireless base stations may be one of a Wi-Fi wireless base station, a fifth-generation (5G) new radio (NR) wireless base station, a sixth-generation (6G) wireless base station, and a long-term evolution (LTE) wireless base station.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present methods, systems, and devices, which, as a matter of language, might be said to fall therebetween.

What is claimed is:

1. A method for dynamic allocation of communication resources, comprising: determining a risk-return characterization of a plurality of communication resource allocations across a plurality of communication channels in a communication system, wherein determining the risk-return characterization comprises determining a respective risk value and a respective return value for each of the plurality of communication resource allocations; selecting a first allocation of the plurality of communication resource allocations from the risk-return characterization according to at least one predetermined criterium; and automatically allocating communication resources among the plurality of communication channels according to the first allocation.

2. The method of claim 1, wherein each of the steps of determining, selecting, and automatically allocating are at least partially performed by a processing subsystem executing instructions stored in a memory subsystem.

3. The method of claim 2, further comprising periodically repeating the steps of determining, selecting, and automatically allocating.

4. The method of claim 2, further comprising performing the steps of determining, selecting, and automatically allocating in response to a change in operation of the communication system.

5. The method of claim 1, wherein the at least one predetermined criterium comprises maximizing communication throughput at a predetermined risk according to an efficiency frontier of the risk-return characterization.

6. The method of claim 1, wherein the at least one predetermined criterium comprises minimizing risk at a predetermined communication throughput according to an efficiency frontier of the risk-return characterization.

7. The method of claim 1, wherein the plurality of communication channels in the communication system comprises a plurality of wireless subcarriers.

8. The method of claim 7, wherein automatically allocating communication resources among the plurality of communication channels according to the first allocation comprises allocating a total transmission power of a wireless base station among the plurality of wireless subcarriers.

9. The method of claim 7, wherein the wireless base station is one of a fifth-generation (5G) new radio (NR) wireless base station, a sixth-generation (6G) wireless base station, a long-term evolution (LTE) wireless base station, and a Wi-Fi wireless base station.

10. The method of claim 7, wherein automatically allocating communication resources among the plurality of communication channels according to the first allocation comprises allocating a total transmission power of a user equipment (UE) device among the plurality of wireless subcarriers.

11. The method of claim 1, wherein each of the plurality of communication channels in the communication system is a wireless communication channel of a respective wireless base station of a plurality of wireless base stations.

12. The method of claim 11, wherein automatically allocating communication resources among the plurality of communication channels according to the first allocation comprises controlling the plurality of wireless base stations to allocate a total transmission power of the plurality of wireless base stations among the plurality of wireless communication channels.

13. The method of claim 12, wherein each of the plurality of wireless base stations is one of a Wi-Fi wireless base station, a fifth-generation (5G) new radio (NR) wireless base station, a sixth-generation (6G) wireless base station, and a long-term evolution (LTE) wireless base station.

14. The method of claim 1, wherein the plurality of communication channels in the communication system comprises a plurality of wireline communication channels.

15. A communication device capable of dynamic allocation of communication resources, comprising: a transmitting subsystem configured to generate a plurality of signals for transmission via respective communication channels of a plurality of communication channels; a memory subsystem; and a processing subsystem configured to execute instructions stored in the memory subsystem to: determine a risk-return characterization of a plurality of communication resource allocations across the plurality of communication channels, including a respective risk value and a respective return value for each of the plurality of communication resource allocations, select a first allocation of the plurality of communication resource allocations from the risk-return characterization according to at least one predetermined criterium, and automatically allocate communication resources among the plurality of communication channels according to the first allocation.

16. The communication device of claim 15, wherein:
the communication device is a wireless base station;

the transmitting subsystem comprises a transceiver and an antenna assembly collectively configured to generate a plurality of wireless subcarriers as the plurality of signals; and the processing system is configured to execute instructions stored in the memory subsystem to automatically allocate communication resources among the plurality of communication channels according to the first allocation by allocating a total transmission power of the wireless base station among the plurality of wireless subcarriers.

17. The communication device of claim 16, wherein the wireless base station is one of a fifth-generation (5G) new radio (NR) wireless base station, a sixth-generation (6G) wireless base station, a long-term evolution (LTE) wireless base station, and a Wi-Fi wireless base station.

18. A communication system capable of dynamic allocation of communication resources, comprising: a plurality of wireless base stations configured to communicate via respective wireless communication channels of a plurality of wireless communication channels; and a controller configured to: determine a risk-return characterization of a plurality of transmission power allocations across the plurality of wireless communication channels, including a respective risk value and a respective return value for each of the plurality of transmission power allocations, select a first allocation of the plurality of transmission power allocations from the risk-return characterization according to at least one predetermined criterium, and automatically allocate transmission power among the plurality of wireless communication channels according to the first allocation.

19. The communication system of claim 18, wherein each of the plurality of wireless base stations is one of a Wi-Fi wireless base station, a fifth-generation (5G) new radio (NR) wireless base station, a sixth-generation (6G) wireless base station, and a long-term evolution (LTE) wireless base station.

* * * * *

UNITED STATES PATENT AND TRADEMARK OFFICE
CERTIFICATE OF CORRECTION

PATENT NO. : 10,959,190 B2
APPLICATION NO. : 16/460164
DATED : March 23, 2021
INVENTOR(S) : Thomas Sandholm et al.

Page 1 of 1

It is certified that error appears in the above-identified patent and that said Letters Patent is hereby corrected as shown below:

On the Title Page
Item (57) the Abstract, Line 8, "predetermined criterium," should read --predetermined criterion,--;

In the Specification
Column 7, Line 18, "predetermined criterium." should read --predetermined criterion.--;
Column 7, Line 19, "predetermined criterium" should read --predetermined criterion--;
Column 7, Line 22, "predetermined criterium" should read --predetermined criterion--;
Column 7, Line 29, "criterium is" should read --criterion is--;
Column 8, Line 44, "predetermined criterium" should read --predetermined criterion--;
Column 11, Line 35, "predetermined criterium" should read --predetermined criterion--;
Column 11, Line 36, "predetermined criterium" should read --predetermined criterion--;
Column 11, Line 39, "predetermined criterium" should read --predetermined criterion--;
Column 11, Line 45, "predetermined criterium" should read --predetermined criterion--;
Column 14, Line 52, "predetermined criterium" should read --predetermined criterion--;
Column 14, Line 53, "predetermined criterium" should read --predetermined criterion--;
Column 14, Line 56, "predetermined criterium" should read --predetermined criterion--;
Column 14, Lines 62-63, "predetermined criterium" should read --predetermined criterion--;
Column 15, Lines 41-42, "predetermined criterium" should read --predetermined criterion--;
Column 15, Line 62, "predetermined criterium" should read --predetermined criterion--;
Column 15, Line 67, "predetermined criterium" should read --predetermined criterion--;
Column 16, Lines 59-60, "predetermined criterium" should read --predetermined criterion--;
Column 17, Line 23, "predetermined criterium" should read --predetermined criterion--;

In the Claims
Column 17, Line 54 (Claim 1), "predetermined criterium" should read --predetermined criterion--;
Column 18, Line 2 (Claim 5), "predetermined criterium" should read --predetermined criterion--;
Column 18, Line 6 (Claim 6), "predetermined criterium" should read --predetermined criterion--;
Column 18, Lines 62-63 (Claim 15), "predetermined criterium" should read --predetermined criterion--;
Column 20, Line 10 (Claim 18), "predetermined criterium" should read --predetermined criterion--.

Signed and Sealed this
Twenty-fifth Day of May, 2021

Drew Hirshfeld
*Performing the Functions and Duties of the
Under Secretary of Commerce for Intellectual Property and
Director of the United States Patent and Trademark Office*